(12) United States Patent
Faragher et al.

(10) Patent No.: US 12,436,297 B2
(45) Date of Patent: Oct. 7, 2025

(54) METHOD, SYSTEM AND COMPUTER PROGRAM PRODUCT FOR PERFORMING CORRELATION IN A POSITIONING SYSTEM

(71) Applicant: Focal Point Positioning Limited, Cambridge (GB)

(72) Inventors: Ramsey Michael Faragher, Cambridge (GB); Robert Mark Crockett, Cambridge (GB); Peter James Duffett-Smith, Cambridge (GB)

(73) Assignee: FOCAL POINT POSITIONING LIMITED, Cambridge (GB)

( * ) Notice: Subject to any disclaimer, the term of this patent is extended or adjusted under 35 U.S.C. 154(b) by 505 days.

(21) Appl. No.: 17/947,911

(22) Filed: Sep. 19, 2022

(65) Prior Publication Data

US 2023/0009945 A1 Jan. 12, 2023

Related U.S. Application Data

(63) Continuation-in-part of application No. PCT/GB2021/050692, filed on Mar. 19, 2021.

(51) Int. Cl.
*G01S 19/42* (2010.01)
*G01S 19/21* (2010.01)
*G01S 19/26* (2010.01)

(52) U.S. Cl.
CPC ............ *G01S 19/428* (2013.01); *G01S 19/21* (2013.01); *G01S 19/26* (2013.01)

(58) Field of Classification Search
CPC ........ G01S 19/21; G01S 19/22; G01S 19/428; G01S 19/26
See application file for complete search history.

(56) References Cited

U.S. PATENT DOCUMENTS

| 5,901,183 A | * | 5/1999 | Garin | G01S 19/22 375/E1.016 |
| 9,562,976 B2 | * | 2/2017 | van Diggelen | G01S 19/428 |

(Continued)

FOREIGN PATENT DOCUMENTS

| CN | 101765785 A | 6/2010 |
| CN | 104254876 A | 12/2014 |

(Continued)

*Primary Examiner* — Cassi J Galt
(74) *Attorney, Agent, or Firm* — MOSER TABOA

(57) ABSTRACT

A method and apparatus for improving signal reception in a radio signal receiver is provided. The method comprises: receiving a signal from one or more remote sources; determining movement of the receiver; obtaining first and second phasor sequences indicative of the determined movement of the receiver in first and second directions; generating a third phasor sequence based on a weighted combination of the first and second phasor sequences in accordance with the first and second directions; and providing a correlation signal using the third phasor sequence, wherein providing the correlation signal comprises correlating a local signal with the received signal, and combining at least one of the local signal, received signal, and the result of the correlation with the third phasor sequence, such that a signal received along the second direction is suppressed relative to a signal received along the first direction. A corresponding positioning system is also disclosed.

26 Claims, 6 Drawing Sheets

(56) References Cited

U.S. PATENT DOCUMENTS

| | | |
|---|---|---|
| 10,031,234 B1 | 7/2018 | Alexander |
| 2009/0122319 A1 | 5/2009 | Ronnekleiv et al. |
| 2017/0279486 A1 | 9/2017 | Faragher et al. |
| 2017/0279598 A1 | 9/2017 | Faragher |

FOREIGN PATENT DOCUMENTS

| | | |
|---|---|---|
| GB | 2 548 620 A | 9/2019 |
| WO | WO 2017/058340 A2 | 4/2017 |
| WO | WO 2017/163042 A1 | 9/2017 |
| WO | WO 2019/008327 A1 | 1/2019 |
| WO | WO 2019/058119 A1 | 3/2019 |
| WO | WO 2019/063983 A1 | 4/2019 |

\* cited by examiner

METHOD, SYSTEM AND COMPUTER PROGRAM PRODUCT FOR PERFORMING CORRELATION IN A POSITIONING SYSTEM

CROSS-REFERENCE TO RELATED APPLICATION(S)

This application is a bypass continuation-in-part of International Application No. PCT/GB2021/050,692, which claims priority to GB Application No. 2004085.3, filed 20 Mar. 2020, each of which is hereby incorporated by reference herein in their entireties.

FIELD

Embodiments of the present invention relate to a method and apparatus that may be used to perform correlation in a radio receiver. More specifically, correlation performed using embodiments of the present invention is capable of significantly enhancing reception of radio signals.

BACKGROUND TO THE INVENTION

In GNSS-based positioning systems (e.g., GPS, GLONASS, Galileo), receivers may determine their global position upon receipt and analysis of signals received by the satellites of the associated constellation.

The signal transmitted by a GNSS satellite contains a pseudo random noise (PRN) code that allows the satellite to be identified. A receiver generates a local replica of the transmitted signal including the PRN code of the satellite and generates a correlation signal by correlating the local replica signal with the received signal. A number of correlation measurements may be performed and the highest correlation peak may be used to determine the phase of the received code as compared to that of the local replica code, and hence the delay of the received signal as compared to a local clock on the receiver. The time delay may be used to calculate the distance from the receiver to the satellite (the "pseudo-range"). By performing this process with respect to four satellites, the global position of the receiver may be determined.

The correlation process is performed when a receiver "locks on" to a satellite (the acquisition phase) and the subsequent tracking phase where the signals from the acquired satellite are tracked as long as it is in use. During the tracking phase, a delay lock loop is typically used to adjust the offset of the local replica codes, while a frequency lock loop and phase lock loop may be used to adjust the frequency and phase of the local carrier signal in order to closely match the received signal over time so as to provide accurate positioning solutions.

However, such a "lock" may be absent during the acquisition phase, or lost due to temporary signal loss or low signal to noise ratios for example. This leads to a reduction in positioning accuracy.

Further problems arise when a receiver is in an environment where multi-path effects are prevalent. Multi-path effects are where a signal from a satellite takes an indirect non-straight-line (NSL) trajectory from the satellite to the receiver, for example as a result of reflection(s) off tall buildings in a so-called urban canyon. Multi-path effects cause two main problems. Firstly, a reflected signal from a satellite may have a higher absolute power than the desired straight-line (SL) signal, in which case the receiver may lock on to the NSL signal. Due to the extra path length of the NSL signal compared to the desired SL trajectory, the pseudo-range is incorrectly calculated. Secondly, the NSL signal may interfere (e.g., constructively or destructively) with the SL signal at the receiver, having an adverse effect on the ability of the receiver to accurately process the received signal.

Commonly assigned patent publication WO2017/163042, which is hereby incorporated herein by reference in its entirety, describes a method for providing so-called "motion compensation" to the correlation process in order to closely match the desired signal along the SL direction. Motion compensation comprises applying a sequence of phasors indicative of the receiver motion to the local replica signal (carrier and PRN code) in order to provide a motion compensated local signal that may be correlated with the received signal. In particular, if the motion compensation is performed along the direction of the SL signal, the highest correlation may be achieved for the SL signal (i.e., the receiver may "lock on" to the desired SL signal) even if the absolute power of the SL is significantly less than the NSL signal(s) onto which conventional receivers would lock.

However, if the desired SL signal has a very low absolute power, the increased gain of the desired SL signal may not be enough to increase its signal-to-noise ratio above the NSL signal, in which case the receiver may still lock on to the NSL signal. As a further problem, spoofing signals may be significantly stronger than the SL signal and motion compensation may not be adequate to prevent inadvertent locking on to the stronger spoofing signal.

Controlled Reception Pattern Antennas (CRPAs) make use of the fact that undesired signals are generally received from different directions from the desired (e.g., SL) signals by implementing a plurality of antennas to provide a spatial discrimination of the received signals. However, such CRPA systems are large and expensive, and are particularly unsuitable for low-cost positioning devices such as smart phones and other handheld devices.

Therefore, there is a continued requirement to provide improvements in radio signal receivers and, especially, in radio signal receivers used in positioning systems.

SUMMARY

Embodiments of the present invention generally relate to a method and apparatus for improving operation of a radio signal receiver as shown in and/or described in connection with at least one of the figures.

These and other features and advantages of the present disclosure may be appreciated from a review of the following detailed description of the present disclosure, along with the accompanying figures in which like reference numerals refer to like parts throughout.

BRIEF DESCRIPTION OF THE DRAWINGS

Embodiments of the invention will now be described with reference to the attached drawings, in which.

DETAILED DESCRIPTION

Figure 1:
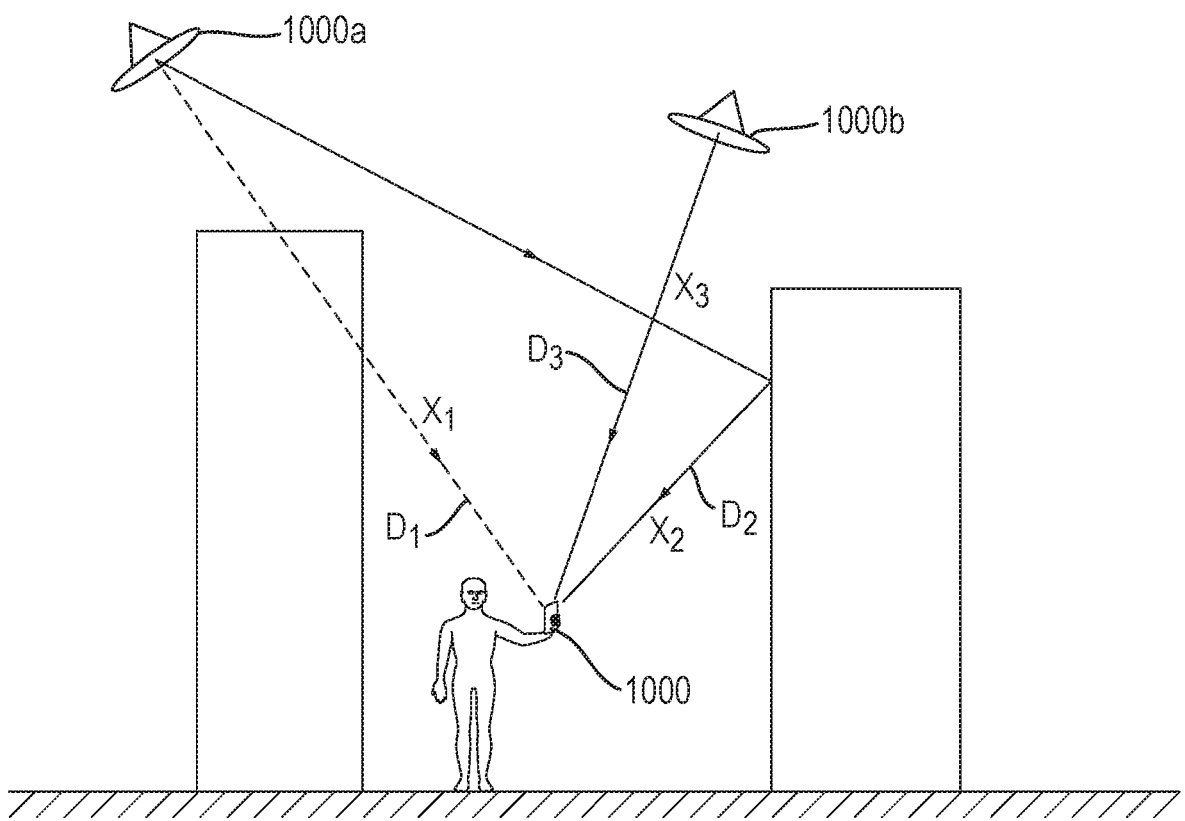
FIG. 1 is a schematic diagram illustrating an example environment in which the method and positioning system of the present invention may be used.

In accordance with a first aspect of the invention, there is provided a method performed in a positioning system, comprising: (a) receiving, at a receiver, signal data from one or more remote sources; (b) measuring or assuming a movement of the receiver; (c) determining a first direction, wherein signals received at the receiver along the first direction are desired to be enhanced; (d) determining a second direction, wherein signals received at the receiver along the second direction are desired to be suppressed; (e) obtaining first and second phasor sequences indicative of the measured or assumed movement of the receiver in the first and second directions respectively, the first and second phasor sequences each comprising one or more phasors which include an amplitude and/or an angle; (f) generating a third phasor sequence based on a weighted combination of the first and second phasor sequences in accordance with the determined first and second directions; (g) providing a local signal; and (h) providing a correlation signal using the third phasor sequence, wherein providing the correlation signal comprises correlating the local signal with the received signal data, and combining at least one of the local signal, received signal data, and the result of the correlation with the third phasor sequence, such that a signal received along the second direction is suppressed relative to a signal received along the first direction.

Embodiments of the present invention comprise obtaining first and second phasor sequences indicative of the determined (measured or assumed) movement of the receiver in the first (i.e., desired) direction and the second (i.e., undesired) direction, and generating a third phasor sequence based on a weighted combination of the first and second phasor sequences. Correlation is then performed using the third phasor sequence. By performing correlation using a weighted combination of phasor sequences indicative of the receiver motion in both the desired and undesired directions, not only may preferential gain be obtained along the desired first direction, but energy received at the receiver from the undesired directions may be actively attenuated. Thus, by providing a correlation signal by combining at least one of the local signal, signal data and the result of the correlation with the third phasor sequence, a signal received along the second direction may be described as being actively suppressed relative to a signal received along the first direction. This provides a significant advantage over prior art methods where correlation is performed using a phasor sequence in respect of only the desired direction, in which case signals from undesired directions are not actively attenuated and, in some cases, may still (undesirably) cause the highest correlation peak.

The first direction may in general be any direction along which signals are desired to be enhanced, by which we mean preferential gain or signal to noise ratio compared to signals received from other directions such that the highest correlation peak in the correlation signal is for a signal received along the first direction. The first direction is typically a straight line (SL) direction from a remote source to the receiver. The straight-line direction can be defined as the direction along the shortest (straight line) path between the receiver and the remote source. In some situations, in practice, the straight-line path may pass through buildings or other objects. In an indoor or urban canyon environment the straight-line path may pass through several objects between the remote source and the receiver. A straight-line direction may commonly be referred to as a "line of sight" (LOS) direction.

The remote source from which signals are received along the first direction is typically a trusted remote source (such as a GNSS positioning satellite), from which received data may be trusted, i.e., taken to be correct. However, in some embodiments, the remote source from which signals are received along the first direction may be an untrusted source, for example in the case where the location of a so-called 'spoofer' is to be detected.

The second direction is in general any direction along which received signals are desired to be actively suppressed below the level of a signal received along the first direction. Typically, the second direction is a non-straight-line (NSL) direction from a remote source to the receiver, or a straight-line direction from an untrusted remote source (e.g., spoofer) to the receiver. A non-straight-line direction is any path taken by a signal that is not the straight-line path between the remote source and the receiver, for example due to reflection(s) off buildings or other objects. (It will be appreciated that a signal received along a non-straight-line direction may have a straight-line trajectory between reflections.) Thus, the first and second directions may refer to signals received from the same remote source, with the first direction referring to the straight-line direction, and the second direction referring to a reflected non-straight-line direction. A non-straight-line direction may commonly be referred to as a "non-line-of-sight" (NLOS) direction.

It will be appreciated that the method may comprise obtaining first phasor sequences for one or more first directions, and obtaining second phasor sequences for one or more second directions, with the weighting of the phasor sequences performed to generate the third phasor sequence. In a typical situation there is a single first direction (e.g., the SL direction to a positioning satellite) and a plurality of second directions (e.g., NSL directions to that positioning satellite and other remote sources). In this way, the present invention is particularly advantageous in mitigating multi-path effects in order to provide increased accuracy positioning solutions.

Embodiments of present invention can advantageously increase the period of coherent integration of the received signal data, thereby enhancing the ability to detect a very weak signal, such as a GNSS signal received indoors. An integration period of around 1 second or longer may be required in order to detect a weak signal. Herein, the term "signal data" is used to mean the (typically plurality of) received signals that are received at the receiver from one or more remote sources. The signal data includes a first signal received along the first direction and a second signal received along the second direction.

The first and second phasor sequences each comprise one or more phasors which are indicative of the amplitude and/or phase changes introduced into the received signal data as a result of the measured or assumed motion of the receiver. Each phasor comprises at least one of an amplitude and angle that describes the measured or assumed movement of the receiver in the respective direction. Typically, the first and second phasor sequences are derived from the measured or assumed movement of the receiver as a function of time. For example, each phasor within a sequence may be indicative of the measured or assumed movement during a particular time interval. Thus, the resulting phasor sequence is indicative of (e.g., corresponds to) the measured or assumed movement of the receiver during a time period made up of the individual time intervals.

The phasor sequences may reflect a detailed movement of the receiver in time. For example, the plurality of phasors within a phasor sequence may reflect the motion of the receiver while it rests in a user's pocket while jogging, walking, running or undergoing some other repetitive motion. In this example the receiver may execute cyclical motion with peaks in acceleration corresponding to each heel strike.

The movement of the receiver may be measured or assumed. The movement of the receiver may be measured using data from one or more sensors configured to obtain data from which movement may be measured. The one or more sensors may include inertial sensors such as accelerometers and gyroscopes. Alternatively, or in addition, the one or more sensors may comprise a barometric sensor for indicating the receiver's height above sea level, a geomagnetic sensor for indicating a receiver's bearing, a visual odometry system and other sensors as would be understood by the skilled person.

In cases where it is not possible to measure the movement of the receiver (e.g., no motion sensor outputs from a motion sensor are available), the movement of the receiver may be assumed based on patterns of receiver movement in previous epochs.

In step (f) a third phasor sequence is generated based on a weighted combination of the first and second phasor sequences in accordance with the determined first and second directions. In other words, the weighting is such that the third phasor sequence, when used in the correlation process, provides preferential gain in the desired first direction(s), and active suppression of a signal received from the undesired second direction(s). In contrast, a correlation process performed with either the first or second phasor sequence only would provide gain along the respective direction but no active suppression along other directions in which signals are received at the receiver.

The third phasor sequence is typically generated using an estimation process. An estimation—or "fitting"—technique performed based on the first and second phasor sequences and the desired sensitivity outcome with respect to the first and second directions provides much improved preferential gain along the first direction(s) together with active attenuation of energy received from the second direction(s) compared to using a linear "addition" or "subtraction" of the first and second phasor sequences. Thus, the estimation process is based on (e.g., the fitting is "to") the desired enhancement of signals received along the first direction and the desired suppression of signals received along the second direction. The desired sensitivity outcome may be represented in the form of weightings indicative of the desired enhancement of signals received along the first direction and the desired suppression of signals received along the second direction, for example in the form of a vector comprising a series of "1"s and "0"s corresponding to the first and second directions respectively. Thus, the estimation process is based on weightings indicative of the desired enhancement of signals received along the first direction and the desired suppression of signals received along the second direction.

In one embodiment, the estimation process used to generate the third phasor sequence is a least-squares fitting process. Thus, in various embodiments, the third phasor sequence is generated using a least-squares fitting process (e.g., using a pseudoinverse technique such as the Moore-Penrose pseudoinverse) based on the desired enhancement of signals received along the first direction and the desired suppression of signals received along the second direction. However, other estimation or "fitting" techniques may be used to generate the third phasor sequence, such as Bayesian inference or least absolute deviations methods.

For example, the third phasor sequence, W, is generated by:

$$W = S^+ Z$$

where S is a (typically two dimensional) matrix representing the first and second phasor sequences and Z is a vector representing the weighting of the first and second directions. $S^+$ is the pseudoinverse of the matrix S, which is typically non-square. $S^+$ may be the Moore-Penrose pseudoinverse of the matrix S. The vector Z typically comprises a series of "1"s and "0"s corresponding to the first and second directions respectively.

However, other means of providing a third phasor sequence based on a weighted combination of the first and second phasor sequences are envisaged, such as genetic algorithms, lookup tables, simulations, brute-force trialling, monte carlo simulations, deep learning or cost functions for example.

In step (h) of the method a correlation signal is provided using the third phasor sequence, wherein providing the correlation signal comprises correlating the local signal with the received signal data, and combining at least one of the local signal, received signal data and the result of the correlation with the third phasor sequence. As described above, the use of the third phasor sequence in the correlation process advantageously actively suppresses a signal received along the second direction relative to a signal received along the first direction. The use of the third phasor sequence in the correlation process is generally referred to as "motion compensation", and the resultant correlation signal may be referred to as a "motion compensated" correlation signal.

It will be appreciated that the received signal data is typically made up of a plurality of signals received from a plurality of different directions. A received signal may include any known or unknown pattern of transmitted information, either digital or analogue, that can be found within the broadcast signal data by a cross-correlation process using a local copy of the same pattern. The received signal may be encoded with a chipping code that can be used for ranging. Examples of such received signals include GPS signals, which include Gold Codes encoded within the radio transmission. Another example is the Extended Training Sequences used in GSM cellular transmissions.

Conventionally, phase changes in the received signal caused by changes in the straight-line path between the receiver and the remote source were viewed as a nuisance that reduced positioning accuracy. The counter-intuitive approach of the invention can actually take advantage of these phase changes to improve identification of the straight-line signal from a remote source, and hence positioning accuracy.

The third phasor sequence can be combined with the local signal before correlation so that it more closely matches the received signal. This is known as providing motion compensation to the local signal. In another arrangement, inverse motion compensation may be applied to the received signal data before correlation to reduce the effect on the received signal data of the motion of the receiver. Similar results may be achieved by providing partial motion compensation to both the local signal and the received signal. These techniques allow relative motion compensation to be applied between the local signal and the received signal. In some embodiments motion compensation may be performed in parallel with correlation. Motion compensation can also be applied to the result of the correlation directly.

In practice, a received signal may be processed as a complex signal, including in-phase and quadrature components. The local signal may be similarly complex. The correlation may provide a correlation signal which may also be complex, and which can be used as a measure of the correlation between these complex signals.

It may be possible to achieve high positioning accuracy by providing motion compensation of at least one of the local signal and the received signal data using the third phasor sequence. In practice, when applied to GNSS signals, the local and received signals may be encoded with a code which repeats periodically. For the GPS L1 C/A codes for example the local and received signals can include 1023 pseudorandom number code chips. The local and received signals may be analogue waveforms which may be digitised to provide values at the radio sampling rate, which means there may be millions of values over a 1 ms time period. The correlation between the local signal digital values and the received signal digital values may be calculated, having first corrected either set of values using motion compensation phasors (of the third phasor sequence) for the relevant time period. These data points may then be summed over the time period. In practice, this can produce an accurate result because it works at the radio sampling frequency, although it may be computationally intensive.

Alternatively, motion compensation may be applied to the result of the correlation (i.e., combining the third phasor sequence with the "initial" correlation signal produced by correlating the local signal with the received signal data, in order to achieve the motion compensated correlation signal). In the above example, when applied to the GPS L1 C/A codes, the correlation may be performed independently on each of the ~1000 pseudorandom number code chips to produce ~1000 complex correlator signal outputs. The motion compensation phasors (of the third phasor sequence) can then be applied to these ~1000 correlation signal components. Finally, the motion compensated correlation signal can be summed to produce a measure of the correlation. Thus, motion compensation of the result of the correlation can be successfully applied at much lower rates than the chipping rate for GPS (~1 MHz) enabling a reduction in computational load. For example, motion compensation can be successfully applied over one or more codeword lengths (<1 kHz), and may be applied to correlation outputs of 5 ms in length (rate of 200 Hz).

The determining of the first direction (or first directions) and the determining of the second direction (or second directions) may be performed in a number of different ways. The first direction may be determined based on a known or estimated position of a remote source. In embodiments where the first direction is a straight-line direction to a GNSS positioning satellite, the positions of the relevant positioning satellites are generally known, for example from a broadcast ephemeris. The initial position of the receiver may be measured or assumed, and in some cases may be fairly crude—for example the city or region of the receiver may be known based on terrestrial radio signals or last known position.

The determining of the second direction may be based on an analysis of the received signal data. In general, the received signal data may be analysed in order to determine one or more second directions (e.g., reflected NSL directions) along which it is desired to suppress received signals. In particular, the received signal data may be analysed in order to determine the presence of reflected signals, which are then desired to be actively suppressed.

Generally, such analysis may comprise generating a respective phasor sequence for one or more directions based on the measured or assumed movement of the receiver in the respective one or more directions; for each direction, providing a direction correlation signal using the respective phasor sequence, wherein providing the direction correlation signal comprises correlating the local signal with the received signal data, and combining at least one of the local signal, received signal data, and the result of the correlation with the respective phasor sequence, and determining the second direction based on an analysis of the respective one or more direction correlation signals. In other words, the result of motion compensation performed in one or more directions may be indicative of the presence of signals received along a second direction, which signals are desired to be suppressed.

In one embodiment, a phasor sequence may be generated for a straight-line direction between the receiver and a remote source, and wherein; the analysis further comprises determining whether a received signal includes a component received in a direction that is different from the straight-line direction, wherein the determination is based on the signal strength of the received signal data from the remote source and the signal to noise ratio of the direction correlation signal. For example, if the signal to noise ratio of the direction correlation signal (which here used motion compensation in the SL direction) is relatively low, but the signal strength of the signals received from the respective satellite is high, this is indicative that a reflected signal is present and is dominating the signal received from that satellite.

In a further embodiment, a "brute force" search of the sky across all elevation angles and azimuths may be performed in order to determine a second direction. In such an embodiment, respective phasor sequences may be generated for a plurality of directions distributed across substantially all possible directions in which a signal can be received at the receiver, and wherein the analysis further comprises determining whether a signal is received along each of the plurality of the directions based at least on the signal to noise ratio of the respective correlation signal. For example, if the signal to noise ratio of a correlation signal is around 1 or higher, this is indicative of the presence of a received signal along the respective phasor direction. As the first direction is generally known, such identified signals in the search of the sky are generally desired to be suppressed.

The determining of the second direction may be based on a topographical model of the environment in which the receiver is located, wherein said model is used to predict the presence of reflected signals that are received at the receiver. Such a topographical model may be a three-dimensional model of the city or region in which the receiver is located, for example. A topographical model may be used in advance of signal data being received in order to predict directions in which reflected signals are likely to be received. In other words, a topographical model may be used to determine the second direction without an analysis of the received data.

Alternatively, a topographical model may be used during analysis of the received data, for example to estimate the direction of a reflected signal (e.g., from a building) following the inference that a reflected signal has been received at the receiver.

The determining of the first direction and the determining of the second direction may be based on prior knowledge of the environment in which the receiver is located. For example, spoofers are most likely to be observed at low elevation angles (located near to the horizon).

At least one phasor sequence in step (e) may be obtained by generating said phasor sequence subsequent to the determining of the first and second directions.

Typically, the steps of determining first and second directions, obtaining first and second phasor sequences indicative of the measured or assumed movement of the receiver along the respective first and second directions, generating the third phasor sequence and providing a correlation signal may all be performed using the same signal data received for the respective correlation time period. However, in certain embodiments, knowledge from previous time periods may be re-used in order to reduce power consumption and improve battery performance.

For example, when the analysis of the received signal data in order to determine the second direction includes generating one or more respective phasor sequences, the method may further comprise storing, in addressable storage, a phasor sequence corresponding to a measured or assumed movement of the receiver in a determined second direction. Thus, in embodiments, at least one phasor sequence obtained in step (e) may be obtained from said addressable storage. This advantageously reduces processing power and battery consumption when performing the steps of the method.

In embodiments, at least one of the determined first direction and determined second direction, and/or at least one phasor sequence obtained in step (e), may be stored in addressable storage. Thus, any one of these parameters may be obtained from addressable storage if it can be assumed that the first and second directions will not change from one time period to the next (e.g., the receiver is positioned on a pedestrian who is walking slowly).

The method may further comprise storing the generated third phasor sequence in addressable storage. Thus, the stored third phasor sequence may be used to provide a correlation signal during a subsequent time period rather than generating a new third phasor sequence, advantageously reducing required processing power and battery consumption. Such re-use of the third phasor sequence is beneficial when a measured or assumed movement of the receiver during the subsequent time period is substantially the same as the measured or assumed movement of the receiver during the time period when the third phasor sequence was constructed, and the first and second directions in the subsequent time period are substantially the same as the first and second directions during the time period when the third phasor sequence was constructed. In other words, the third phasor sequence may advantageously be re-used from one (e.g., correlation) time period to another when the "pattern" of signals received in the two time periods is substantially the same. Such a scenario may be assumed for a pedestrian walking at a slow speed for example, where the first and second directions of received signals are unlikely to vary significantly between correlations.

The method further comprises determining a position of the receiver based on the correlation signal generated in step (h). This can be achieved in the known way by establishing ranges to at least three positioning sources and using a mathematical filter to determine position. The calculated position can be used in a wide variety of applications as is known in the art.

In various embodiments, the method may further comprise: providing a local frequency or phase reference using a local oscillator; determining an offset between the local frequency or phase reference and a received frequency or received phase of a first reference signal received from at least one of the remote sources, said first reference signal having a known or predictable frequency or phase; and wherein at least one of the first and second phasor sequences obtained in step (e) is indicative of the determined offset (e.g. as a function of time). The amplitude and/or angle of the phasors in first and second phasor sequences may be adjusted based on the determined offset (or time series of offsets). Such embodiments advantageously facilitate the removal of errors introduced to the correlation signal by instabilities in the local oscillator. This is particularly advantageous in implementations where the local oscillator is simple and low cost such as a quartz crystal (e.g., smart phones).

Errors in the local oscillator can be isolated by removing the effects introduced to the received phase or the received frequency based on the relative movement between the receiver and the remote source from which the reference signal is received ("reference source") along a vector between the two. Thus, the method may comprise determining the component of motion of both the receiver and the reference source along the straight-line direction ("line of sight") between the two. By compensating for the offset between the local frequency or phase provided by the local oscillator and the reference signal, a moving receiver can provide longer coherent integration of signals than would otherwise be possible. Coherent integration of received signals over periods of one second or longer are possible. This means that the sensitivity of the receiver is improved such that, in combination with the use of the weighted phasor sequence discussed above, weaker positioning signals may be detected and used in positioning calculations.

The reference source may be a terrestrial transmitter. For example, the reference source may be a cellular transmitter or DAB, DVB-T or analogue broadcasts. The reference source may be a satellite, e.g., a GNSS satellite which has an atomic local oscillator with high stability. The reference source may be a remote source along one of the first or second directions. Importantly, the local oscillator in the remote source should, at least, be more stable that the local oscillator.

As discussed, the determined offset may be exhibited in the first and second phasor sequences that are used to generate the third, weighted, phasor sequence. Alternatively, the method may further comprise providing a local frequency or phase reference using a local oscillator; determining an offset between the local frequency or phase reference and a received frequency or received phase of a first reference signal received from at least one of the remote sources, said first reference signal having a known or predictable frequency or phase; and using said offset to provide the local signal. In such embodiments, the local signal used for correlation is generated using the local frequency or phase reference from the local oscillator, and the determined offset. In theory, the correction may be applied to at least one of the local signal, received signal data and the correlation signal.

The method may comprise determining a sequence of offsets between the local frequency or phase reference and the received frequency or received phase of the first reference signal as a function of time, and using said sequence of offsets to provide the local signal. Thus, the sequence of offsets may be represented as a phasor sequence having an amplitude and/or angle representative of the determined offset over time.

In accordance with a second aspect of the invention, there is provided a computer program product comprising executable instructions which, when executed by a processor in a positioning system, cause the processor to perform the steps as described above in relation to the first aspect of the invention.

In accordance with a third aspect of the invention, there is provided a positioning system comprising: a receiver configured to receive signal data from one or more remote sources; a motion module configured to provide a measured or assumed movement of the receiver; a direction determination unit configured to determine a first direction and a second direction, wherein signals received at the receiver along the first direction are desired to be enhanced and signals received at the receiver along the second direction are desired to be suppressed; a local signal generator configured to provide a local signal; a phasor generation unit configured to: (i) obtain first and second phasor sequences indicative of the measured or assumed movement of the receiver in the first and second directions respectively, the first and second phasor sequences each comprising one or more phasors which include an amplitude and/or an angle, and (ii) generate a third phasor sequence based on a weighted combination of the first and second phasor sequences in accordance with the determined first and second directions; and a correlation unit configured to provide a correlation signal using the third phasor sequence, wherein providing the correlation signal comprises correlating the local signal with the received signal data, and combining at least one of the local signal, received signal data, and the result of the correlation with the third phasor sequence, such that a signal received along a second direction is suppressed relative to a signal received along the first direction.

Thus, the positioning system of the third aspect of the invention provides all of the advantages as described above in relation to the first aspect. In general, the positioning system of the third aspect of the invention may be configured to perform any of the steps of the first aspect of the invention, for example through the use of an appropriately programmed processor.

As with the first aspect of the invention, the first direction is typically a straight-line direction from a remote source to the receiver. The second direction is typically a non-straight-line direction from a remote source to the receiver, or a straight-line direction from an untrusted remote source to the receiver.

Typically, the third phasor sequence is generated using an estimation process, for example, a least-squares fitting process. Typically, the estimation process is based on the desired enhancement of signals received along the first direction and the desired suppression of signals received along the second direction.

In an embodiment, the third phasor sequence, W, is generated by:

$$W = S^+ Z$$

where S is a matrix representing the first and second phasor sequences, $S^+$ is its pseudoinverse, and Z is a matrix representing the weightings of the first and second directions.

The receiver may comprise an antenna and electronics for processing the received signal data. In various embodiments, the motion module is configured to provide a determined movement of the antenna. In various embodiments, the receiver comprises exactly one (i.e., a single) antenna for receiving the signal data. Thus, improved positioning solutions may be obtained using the present invention in devices having only one antenna (e.g., smartphones). This is in contrast to conventional solutions such as CRPAs that use a plurality of antennas to determine different directions in which signals are received. However, it is envisaged that the present invention may also be used in positioning systems having two or more antennas.

The positioning system further comprises a positioning unit configured to determine a position of the receiver based on the correlation signal.

The motion module typically comprises at least one inertial sensor such as an accelerometer or gyroscope. However, other sensors are envisaged that may be used to measure the movement of the receiver, for example a barometric sensor, geomagnetic sensor or visual odometry unit. The motion module may typically be or comprise an inertial measurement unit (IMU). Alternatively, the motion module may assume the movement of the receiver based on patterns of movement in previous epochs.

In various embodiments, the positioning system may further comprise addressable storage configured for storing at least one phasor sequence generated by the phasor generation unit and/or at least one of the first and second directions determined by the direction determination unit. This advantageously means that the stored phasor sequence(s) may be re-used during subsequent time periods if appropriate (for example if the measured or assumed movement of the receiver and the first and second directions are deemed to be substantially the same in two separate time periods). Such re-use of the phasor sequences beneficially reduces the required computing power and battery resources.

In various embodiments, the positioning system may further comprise a local oscillator configured to provide a local frequency or phase reference; and a local oscillator offset determination unit configured to determine an offset between the local frequency or phase reference and a received frequency or received phase of a first reference signal received from at least one of the remote sources, said first reference signal having a known or predictable frequency or phase, and wherein at least one of the first and second phasor sequences obtained by the phasor generation unit is indicative of the determined offset. Such embodiments advantageously allow for longer coherent integration times of one second or longer, as explained above in relation to the first aspect of the invention.

In embodiments, the positioning system may further comprise a local oscillator configured to provide a local frequency or phase reference; and a local oscillator offset determination unit configured to determine an offset between the local frequency or phase reference and a received frequency or received phase of a first reference signal received from at least one of the remote sources, said first reference signal having a known or predictable frequency or phase, and wherein the local signal generator is configured to use the local frequency or phase reference from the local oscillator, and the determined offset, to provide the local signal. In one embodiment, the local oscillator offset determination unit is configured to calculate a sequence of offsets between the local frequency or phase reference and the received frequency or received phase of the first reference signal as a function of time.

The positioning system is typically provided on a single (e.g., GNSS) positioning device. Such a single positioning device may be provided in an electronic user device such as a smartphone. Alternatively, various modules in the positioning system (such as the correlation unit, direction determination unit and the phasor generation unit) could be provided separately so that the positioning system is distributed (i.e., configured as a distributed system). For example, certain calculations, such as calculations performed by the phasor generation unit and/or the correlation unit may be undertaken by processors in a network. Thus, an electronic user device may offload calculations to other processors in a network where appropriate in the interests of efficiency.

In any of the embodiments of the present invention, the receiver is typically a GNSS receiver. The at least one remote source typically includes at least one GNSS satellite.

The method and positioning system of various embodiments of the present invention may typically be used to determine position. However, the embodiments may be used to determine other metrics such as time and frequency. The metrics determined by embodiments of the invention may be used in navigation or tracking applications.

FIG. 1 is a schematic diagram illustrating an example environment in which the method and positioning system of at least one embodiment of the present invention may be used, by way of example. Here, a positioning device 1000 is positioned within an "urban canyon" environment, located between tall buildings from which radio signals, including GNSS signals from remote sources, may be reflected. Such an "urban canyon" environment is typically a challenging environment for positioning systems to accurately determine a position solution.

In the example of FIG. 1, the positioning device 1000 receives a weak straight-line (SL) signal $X_1$ from a first positioning satellite 1000a, a relatively strong reflected non-straight-line (NSL) signal $X_2$ from the same satellite 1000a, and a strong non-straight-line signal $X_3$ from a second remote source 1000b, which for the purposes of this example is a spoofer. The relative weakness of the SL signal $X_1$ as compared to signals $X_2$ and $X_3$ is schematically illustrated by the dashed line of signal $X_1$, and is due to the fact that the SL signal $X_1$ travels through a tall building on its path from the satellite to the receiver.

The signal $X_1$ is received at the receiver along a direction $D_1$; signal $X_2$ is received at the receiver along a direction $D_2$; and signal $X_3$ is received at the receiver along a direction $D_3$.

Figure 2:
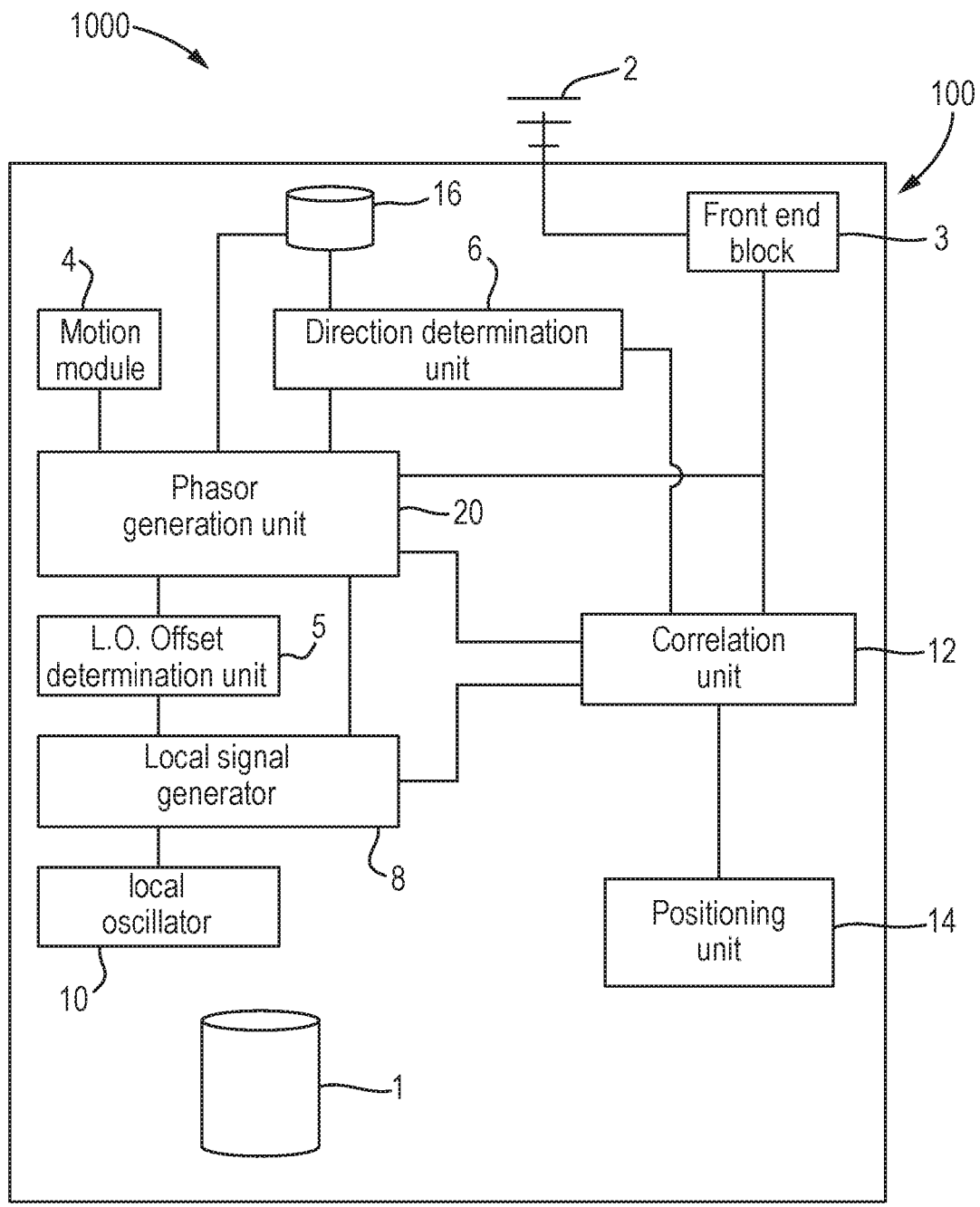
FIG. 2 is a schematic diagram illustrating the pertinent parts of a positioning system according to an embodiment of the invention.

FIG. 2 is a schematic diagram illustrating the pertinent parts of a positioning system according to the invention. A receiver 100 includes an antenna 2 for receiving radio signals such as GNSS signals. In this example the receiver 100 comprises a single antenna, and may be a part of a handheld electronic device such as a smartphone. Typically, the broadcast signal received at the antenna is an analogue signal, and is amplified, down converted to baseband or lower frequency and converted to digital form by an analogue to digital converter; these processes take place in receiver front-end block 3. The digitised signal is then processed (correlated) as will be discussed below.

A received signal is correlated in a correlation unit 12 against a local replica of that signal generated by a local signal generator 8. The correlation unit comprises a correlator. The local signal generator 8 is configured to generate local copies of known correlation sequences (such as pseudorandom number (PRN) codes for GNSS satellites) using a frequency or phase reference of a local oscillator 10.

A motion module 4 includes sensors that can measure the motion of the receiver 100, in particular the motion of the antenna 2. The motion module 4 can include inertial sensors such as accelerometers and gyroscopic sensors, data from which may be used to infer the motion of the receiver. The motion module 4 typically comprises an inertial measurement unit (IMU) using inertial sensors, although other (non-GNSS) means of determining a motion of the receiver may alternatively or additionally be used, such as barometers, magnetometers and visual odometry systems, e.g., a Google Tango® system. In embodiments the motion module may be in a closed loop system incorporating the positioning unit.

A phasor generation unit 20 derives motion compensation phasors indicative of the motion of the receiver measured by the motion module 4. The motion compensation phasors may be applied to at least one of the local signal from the local signal generator 8, the received signal data, and the result of the correlation (e.g. the initial output from the correlator within correlation unit 12). Phasors generated by the phasor generation unit 20 may be stored in local storage 16.

Each phasor comprises at least one of an amplitude and a (phase) angle.

A direction determination unit (DDU) 6 is operable to determine along which direction or directions received signals should be enhanced, and along which direction or directions received signals should be actively suppressed. The determined directions may be stored in local storage 16.

A local oscillator offset determination unit (LO unit) 5 is operable to determine an offset (an "error") between the reference frequency or phase provided by the local oscillator 10 and a frequency or phase of a reference signal received from a remote reference source that has a known or predictable frequency or phases. In this way, the accuracy of the local oscillator 10 may be matched to the accuracy of the reference source. Such techniques will be described in more detail below.

Upon correlation by the correlation unit 12, positioning unit 14 calculates the position of the receiver based on the results of the correlation in combination with the phasors generated by the phasor generation unit. In other embodiments different physical metrics could be determined, such as time or frequency.

Each of the above described units of the positioning system is in logical communication with a processor 1, which is operable to control the operation of the various units in accordance with executed software or firmware. In the presently shown embodiment, the modules are provided within a single positioning device, although in alternative embodiments they may be provided in a distributed fashion across a network.

Figure 3:
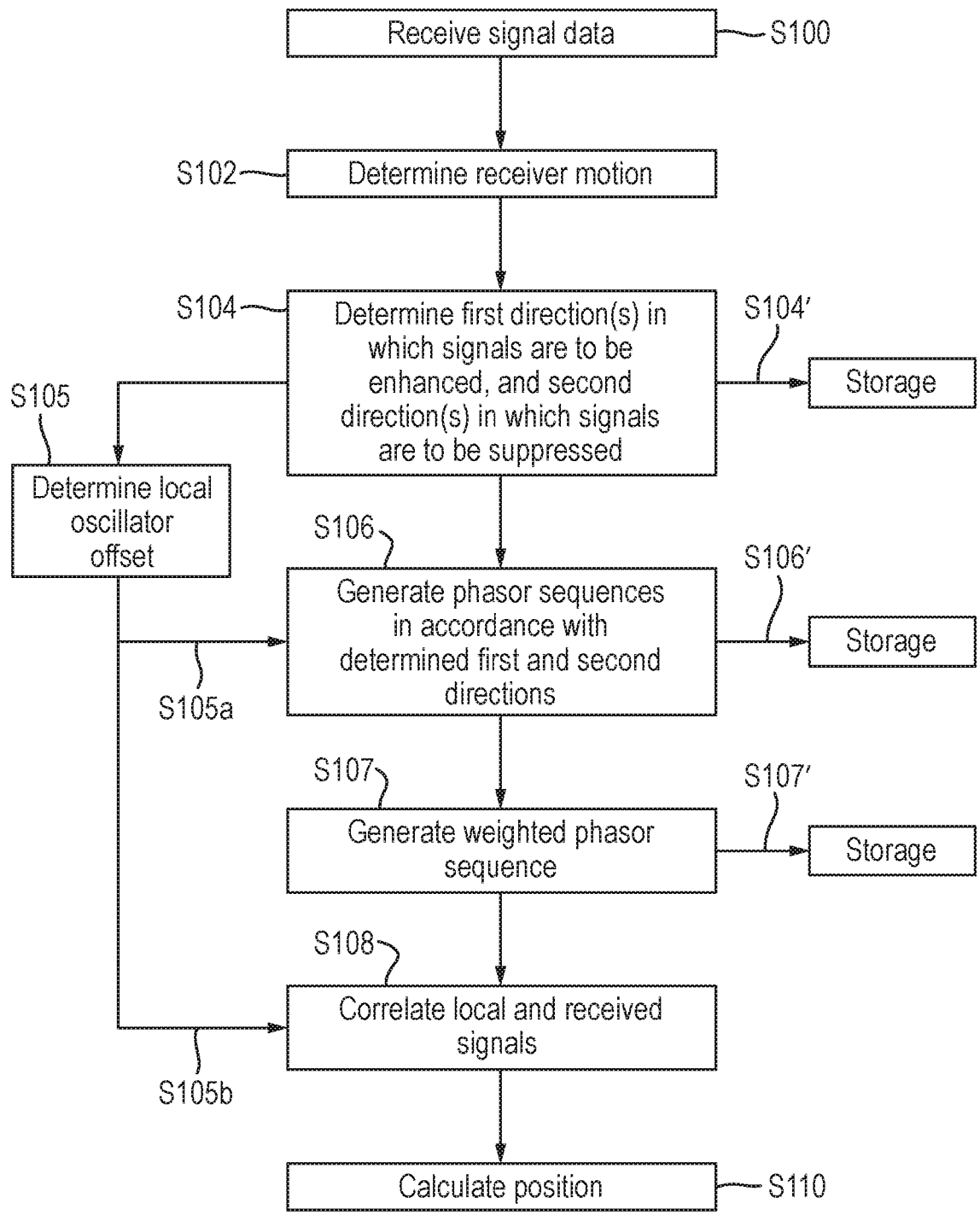
FIG. 3 is a flow diagram outlining the main steps of an embodiment of the invention.

FIG. 3 is a flow diagram showing the main steps of an embodiment of the invention, and will be described with reference to the receiver 100 and environment illustrated in FIGS. 1 and 2. At step S100 the receiver 100 receives signal data from remote sources 1000a and 1000b. It will be appreciated that the signal data comprises signals $X_1$, $X_2$ and $X_3$ (as well as further signals that are not illustrated in the present example, e.g., further reflected NSL signals from satellite 1000a or signals from additional remote sources).

Positioning satellite 1000a is a trusted source such as a GNSS positioning satellite. FIG. 1 illustrates a form of noise that can arise in positioning systems known as multi-path effects. Here, the SL signal $X_1$ and the NSL "multi-path" signal $X_2$ originated from the same remote source 1000a but have arrived at the receiver 100 via different paths. These signals are therefore received at different times and possibly with different attenuation and phase characteristics. Thus, the signals $X_1$ and $X_2$ may act as noise in relation to each other (e.g., through destructive and/or constructive interference), causing significant problems in positioning accuracy. Furthermore, as schematically illustrated in FIG. 1, the SL signal $X_1$ has a lower absolute power than NSL signal $X_2$ due to signal $X_1$ being attenuated on its path between the remote source 1000a and receiver 100. Thus, conventionally, a receiver may "lock on" to reflected signal $X_2$ which has the higher absolute power, leading to an incorrect pseudo range calculation due to the extra path length. The present invention helps to mitigate such problems, as will be described.

In this example the second remote source 1000b is an un-trusted remote source such as a spoofer. Signal $X_3$ is received along a straight-line direction $D_3$ from the spoofer, although contains incorrect positioning data. Therefore, processing of signal $X_3$ by the positioning system would produce an undesirably incorrect positioning solution.

At step S102, the motion module 4 determines the movement of the receiver, for example using data obtained from an IMU. Alternatively, at step S102 the receiver may assume a motion of the antenna based on a previously detected pattern of movement. For instance, if previous measurements by the motion module 4 indicated that the receiver was moving in a constant direction and at a constant speed then it may be assumed that the current movement is the same as movement in previous epochs. Steps S100 and S102 are typically performed in a continuous manner while the position of the receiver is calculated.

At step S104, the DDU 6 determines one or more first directions in which signals are desired to be enhanced and one or more second directions in which signals are desired to be actively suppressed. Typically, the direction determination module 6 determines a single first direction in which a signal is to be enhanced and a plurality of directions along which received signals are desired to be suppressed. In the example shown in FIG. 1, the first direction is the SL direction $D_1$ between the positioning satellite 1000a and the receiver 100, i.e., it is desired to enhance the signal $X_1$. The second directions along which received signals are desired to be suppressed are the NSL direction $D_2$ between positioning satellite 1000a and the receiver 100, and the SL direction $D_3$ between the spoofer 1000b and the receiver 100. In other words, it is desired to actively suppress signals $X_2$ and $X_3$ below the power of the weak SL signal $X_1$.

As in the present example, the first direction is typically a SL direction to a trusted source such as a positioning satellite, and may be known or estimated from broadcast ephemeris from the satellite constellation. A number of different techniques may be used to determine the second direction(s). These may include:

Scanning the sky across substantially all elevation and azimuth angles in order to measure the directions from which signals are received, and using predetermined criteria to determine whether the received signals are reflected (i.e., undesired NSL) signals.

Using three-dimensional map aiding in order to estimate directions of reflected (i.e., undesirable) signals.

Choosing specific directions due to prior knowledge, for example spoofers are most likely to be observed near to the horizon (have small angles of elevation).

Figure 6:
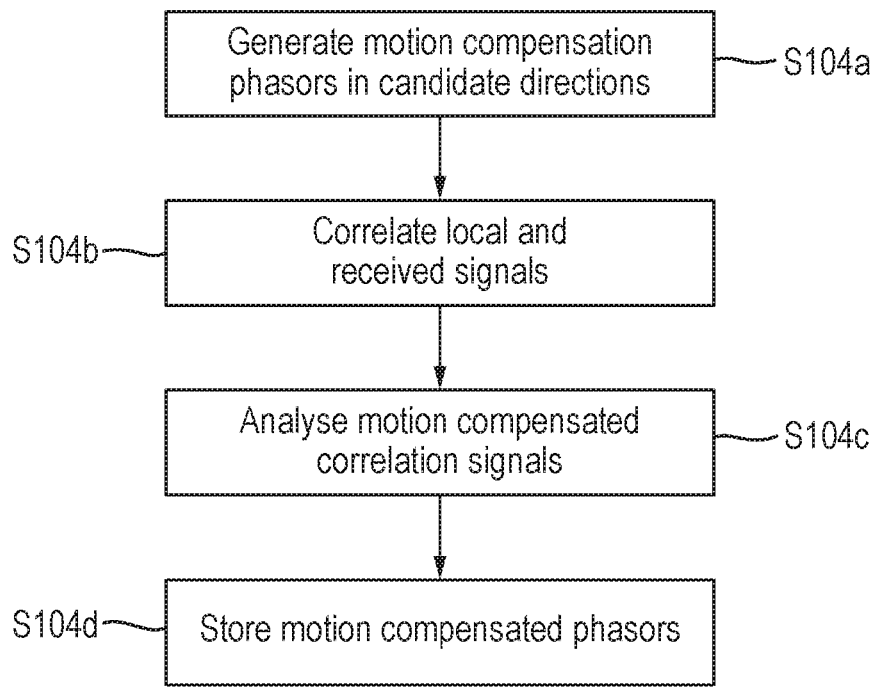
FIG. 6 is a flow diagram outlining the steps of an example embodiment of the invention.

These techniques will be further described herein in relation to FIG. 6. More detail on such techniques can be found in commonly assigned patent publication WO2019/058119, which is hereby incorporated herein by reference in its entirety.

The determined first and second directions may be stored in local storage 16 (step S104') and re-used in appropriate subsequent time periods where it is assumed that the motion of the receiver and the first and second directions remain substantially constant across the time periods.

The method may optionally include step S105 of determining an offset of the frequency or phase reference of the local oscillator 10 with respect to a reference frequency or phase of a reference signal received by a reference source. This is performed by the local oscillator offset determination unit 5. Firstly, a reference source is selected based on the received signal data. The reference source should have a highly stable local oscillator, which is at least more stable than the local oscillator 10 in the receiver. The reference source may be a satellite or a terrestrial transmitter, with the reference signal being received by the receiver along a direct straight-line path. For the purposes of this example, we assume that the reference source is a satellite in the constellation (not shown in FIG. 1) having an unobstructed SL with the receiver.

Next, the local oscillator offset determination unit 5 determines the component of the measured movement of the receiver (obtained in step S102) along the direction of the selected reference source. The local oscillator offset determination unit further determines the motion of the reference source. In particular, the local oscillator offset determination unit 5 determines the component of the motion of the selected reference source along the straight-line between the receiver and the reference source. Thus, the local oscillator offset determination unit can determine the relative movement of the receiver and the selected reference source along the vector that connects them.

Thus, the local oscillator offset determination unit 5 can calculate the frequency or phase error that is introduced to the received reference signal due to the relative movement of the reference source and the receiver 100. The received reference signal is provided by the reference source at a known and stable frequency or phase. Therefore, once the Doppler error is removed, any remaining differences between the known frequency or phase of the reference source and the frequency or phase that is actually received can be attributed to an error in the local frequency or phase reference provided by the local oscillator 10. On this basis, the local oscillator offset determination unit 5 is configured to calculate an offset to the frequency or phase reference provided by the local oscillator 10. Further details of determining the error in the frequency or phase provided by the local oscillator 10 can be found in commonly assigned patent publications WO2019/008327 and WO2019/063983, which are hereby incorporated herein by reference in their entireties.

At step S106, the phasor generation unit 20 generates phasor sequences in accordance with the first and second directions as determined by the direction determination unit 6. More specifically, the phasor generation unit generates a respective phasor sequence that is indicative of the receiver's motion along each of the signal directions $D_1$, $D_2$ and $D_3$.

Each phasor sequence $\phi$ comprises a plurality of phasors, with each phasor typically having the same time duration as a sample of the received signal. There is typically the same number N of phasors $\phi_i$ ($i=1 \ldots N$) in a generated phasor sequence $\phi$ as there are samples of the received signal and samples of the local signal during the time period within which the signal data are received and the receiver movement is measured. Each phasor $\phi_i$ represents a phase and/or amplitude compensation based upon the motion of the receiver at a time t such that a phasor sequence made up of a plurality of phasors is indicative of the receiver motion along a particular direction as a function of time. Thus, the phasor sequence may be referred to as a "motion-compensated" phasor sequence.

In embodiments where a local oscillator offset is determined in step S105, each phasor sequence ϕ generated at Step S106 may further represent a phase and/or amplitude compensation based on the offset determined by the local oscillator offset determination unit 5. This is represented by step S105a in FIG. 3.

A phasor $\phi_i$ is a transformation in phase space and is complex valued, producing the in-phase component of the motion-compensated phasor sequence via its real value, and the quadrature phase component of the motion-compensated phasor sequence via its imagery value. The phasor $\phi_i$ is typically a cyclic phasor and may be expressed in a number of different ways, for example as a clockwise rotation from the real axis or as an anti-clockwise rotation from the imaginary axis. As explained above, the phasor sequence for each direction is indicative of the measured (or assumed) movement of the receiver along that direction.

The determined phasor sequences for the respective first and second directions may be stored in local storage 16 (step S106') and re-used in appropriate subsequent time periods where it is assumed that the motion of the receiver and the first and second directions remain substantially constant across the time periods.

Once the phasor sequences for each direction (both desired SL directions and undesirable NSL/untrusted SL directions) have been obtained, a weighted phasor sequence is generated based on a weighted combination of the individual direction phasor sequences (step S107). The weighted phasor sequence vector W is given by the following equation:

$$W = S^+ Z,$$

where S is a matrix representing the individual phasor sequences corresponding to signal directions $D_1$, $D_2$ and $D_3$, and Z is a weighting vector.

$S^+$ refers to the pseudoinverse of the matrix S, and may be obtained using a Moore-Penrose pseudoinverse or similar method for solving the inversion of non-square matrices.

We now describe an example process for generating the weighted phasor sequence vector W using the following pseudocode.
   a={number of elements in the weighted phasor sequence vector W};
   dx={change in receiver position along x axis};
   dy={change in receiver position along y axis};
   dz={change in receiver position along z axis};
   f={radio frequency of the received signal};
   b={incidence angle of the received signal};
   A={vector of incidence angles to be suppressed};
   c={speed of the signal carrier in this medium (e.g., speed of light)};
   Z={desired gain vector};
   i=imaginary operator;
   We first construct the sequence of changes in receiver position over time during the creation of vector W:
   for J=1: a
   d(J)=sqrt(dx(J)^2+dy(J)^2+dz(J)^2);
   end Next, generate the phasor sequence ϕ for the signal arrival direction of interest (e.g. SL signal), noting that without loss of generality one can choose to build a weighted phasor sequence vector W consisting of the K first phasor sequences ϕ as long as K<a, i.e. there are K signal directions of interest and the receiver is moving relative to the signal and/or signal reflections of interest. Typically, K=1 (the single straight-line path to the trusted satellite).
   for I=1: K
   for J=1: a
   ϕ(I,J)=exp (i*(2*pi*f*d(J)*cos(b(I,J)))/c);
   end
   Z(I)=1;
   end Note that for situations where the receiver is moving in a straight line and the total path length (|d(end)−d(1)|) is much smaller than the distance to any reflectors or to the signal source, then b(I,J)=b(I)=constant across a given calculation of the weighted phasor sequence vector W.

Next generate the phase sequences ϕ for the signal arrivals that are desired to be attenuated strongly:
   for I=K+1: length(A)
   for J=1: a
   ϕ(I,J)=exp (i*(2*pi*f*d(J)*cos(b(I,J)))/c);
   end
   Z(I)=0;
   end Finally, solve for the weighted phasor sequence vector W by performing the following matrix manipulation:

$$W = (\text{pinv}(S) * Z)$$

where pinv refers to a Moore Penrose pseudoinverse or similar method of solving the inversion of non-square matrices, and Z is the vector of desired weights for the different received signal directions (1 for desired signal directions to be enhanced and 0 for signal directions to be suppressed).

The resulting weighted phasor sequence vector W can then be applied to coherently integrate the received signal data.

Continuing with the example environment that has been described above in relation to FIG. 1, and assuming for simplicity that there are four elements in the weighted phasor sequence vector W, i.e., a=4, the phasor sequence along direction $D_1$ can be expressed as:

$$\phi 1 = (\phi(1,1)\phi(1,2)\phi(1,3)\phi(1,4));$$

the phasor sequence directed along direction $D_2$ can be expressed as:

$$\phi 2 = (\phi(2,1)\phi(2,2)\phi(2,3)\phi(2,4));$$

and the phasor sequence directed along direction $D_3$ can be expressed as:

$$\phi 3 = (\phi(3,1)\phi(3,2)\phi(3,3)\phi(3,4));$$

Thus, S may be written as:

$$S = \begin{pmatrix} \phi 1 \\ \phi 2 \\ \phi 3 \end{pmatrix} = \begin{pmatrix} \phi(1,1) & \phi(1,2) & \phi(1,3) & \phi(1,4) \\ \phi(2,1) & \phi(2,2) & \phi(2,3) & \phi(2,4) \\ \phi(3,1) & \phi(3,2) & \phi(3,3) & \phi(3,4) \end{pmatrix}$$

As it is desired to enhance signals received along direction $D_1$ and actively suppress signals received along directions $D_2$ and $D_3$, the vector Z takes the form:

$$Z = (1,0,0).$$

Thus, $$W = \begin{pmatrix} \phi(1,1) & \phi(1,2) & \phi(1,3) & \phi(1,4) \\ \phi(2,1) & \phi(2,2) & \phi(2,3) & \phi(2,4) \\ \phi(3,1) & \phi(3,2) & \phi(3,3) & \phi(3,4) \end{pmatrix}^+ \begin{pmatrix} 1 \\ 0 \\ 0 \end{pmatrix}$$

The generated weighted phasor sequence vector W may be stored in local storage 16 (step S107') and re-used in appropriate subsequent time periods where it is assumed that the motion of the receiver and the first and second directions remain substantially constant across the time periods.

Referring back to FIG. 3, in step S108 the correlation unit 12 correlates the local signal from the local signal generator 8 with the received signal data, with motion compensation applied by combining the weighted phasor sequence vector W with at least one of the local signal and received signal data prior to correlation. Alternatively, or in addition, the weighted phasor sequence vector W may be combined with the result of the correlation. The outcome of this correlation operation in combination with the weighted phasor sequence W advantageously provides enhanced gain on the SL direction $D_1$ and maximal suppression of unwanted energy from directions $D_2$ and $D_3$ as energy from these undesired directions is actively attenuated through the weighting of the individual phasor sequences as explained above. This technique dramatically improves the ability to detect and use straight-line-path positioning signals in challenging environments, such as urban canyons as seen in FIG. 1, and even indoor environments. In the example of FIG. 1, it may mean that the SL signal $X_1$, which is significantly attenuated by a building, is made available for positioning calculations, given the active attenuation of the energy received along directions $D_2$ and $D_3$.

As discussed above, in embodiments where a local oscillator offset is determined in step S105, the phasor sequences generated in step S106 may represent a phase compensation based on the frequency or phase offset determined by the local oscillator offset determination unit 5 (step S105a). Alternatively, in step S108 the local signal generator 8 may generate a local signal using the frequency or phase reference provided by the local oscillator 10 together with the offset determined by the local oscillator offset determination unit 5. This is represented by step S105b in FIG. 3. The accuracy of the local oscillator may therefore be matched to the accuracy of the local oscillator of the reference source, and thus the local signal may be provided with greater stability.

The use of the phase or frequency offset determined by the local oscillator offset determination unit 5 in the correlation process (either introduced via S105a or S105b) can advantageously allow a received positioning signal to be integrated coherently over a period of 1 second or longer without introducing errors due to any inherent instability in the local oscillator 10.

Figure 4:
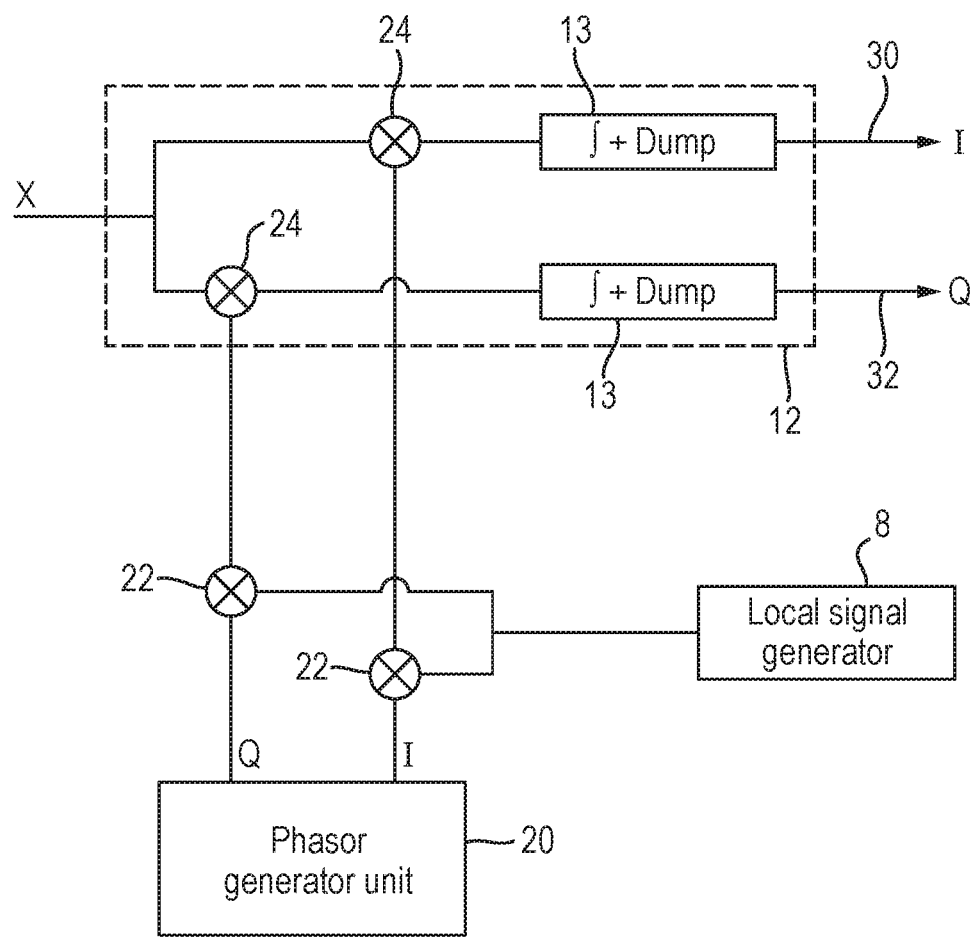
FIG. 4 schematically illustrates how motion compensation may be applied during the correlation process.

The weighted phasor sequence vector W may be applied to at least one of the local signal, the received signal data, or the initial output from the correlation unit 12. FIG. 4 is a schematic diagram illustrating how the weighted phasor sequence vector W may be applied to the local signal in order to provide motion compensation, with equivalent process being performed when applying the weighted phasor sequence vector W to the received signal data or the result of the correlation. As explained above, phasor generation unit 20 produces a weighted motion-compensated phasor sequence vector W that comprises an in-phase component I and a quadrature phase component Q. Both of the in-phase component I and the quadrature phase component Q are mixed (22) with the same correlation code produced by the local signal generator 8 to produce a motion-compensated correlation code as an in-phase component I and a quadrature phase component Q. The correlation unit 12 mixes (24) the in-phase component of the motion-compensated correlation code with the received signal X (in digital form) and performs an integration and dump 13 on the result to produce an in-phase correlation result 30. The correlation unit 12 mixes (24) the quadrature phase motion-compensated correlation code with the same received signal X and performs an integration and dump 13 on the result to produce the quadrature phase correlation result 32.

As has been explained herein, in general the weighted phasor sequence vector W may be applied to at least one of the local signal, received signal data and the result of the correlation in order to perform motion compensation. Further details on the generation of motion-compensated phasor sequences and their use in correlation can be found at commonly assigned patent publication WO2017/163042, which is hereby incorporated herein by reference in its entirety.

At step S110, the position of the receiver is calculated based on the results of the correlation process as is known in the art.

Figure 5:
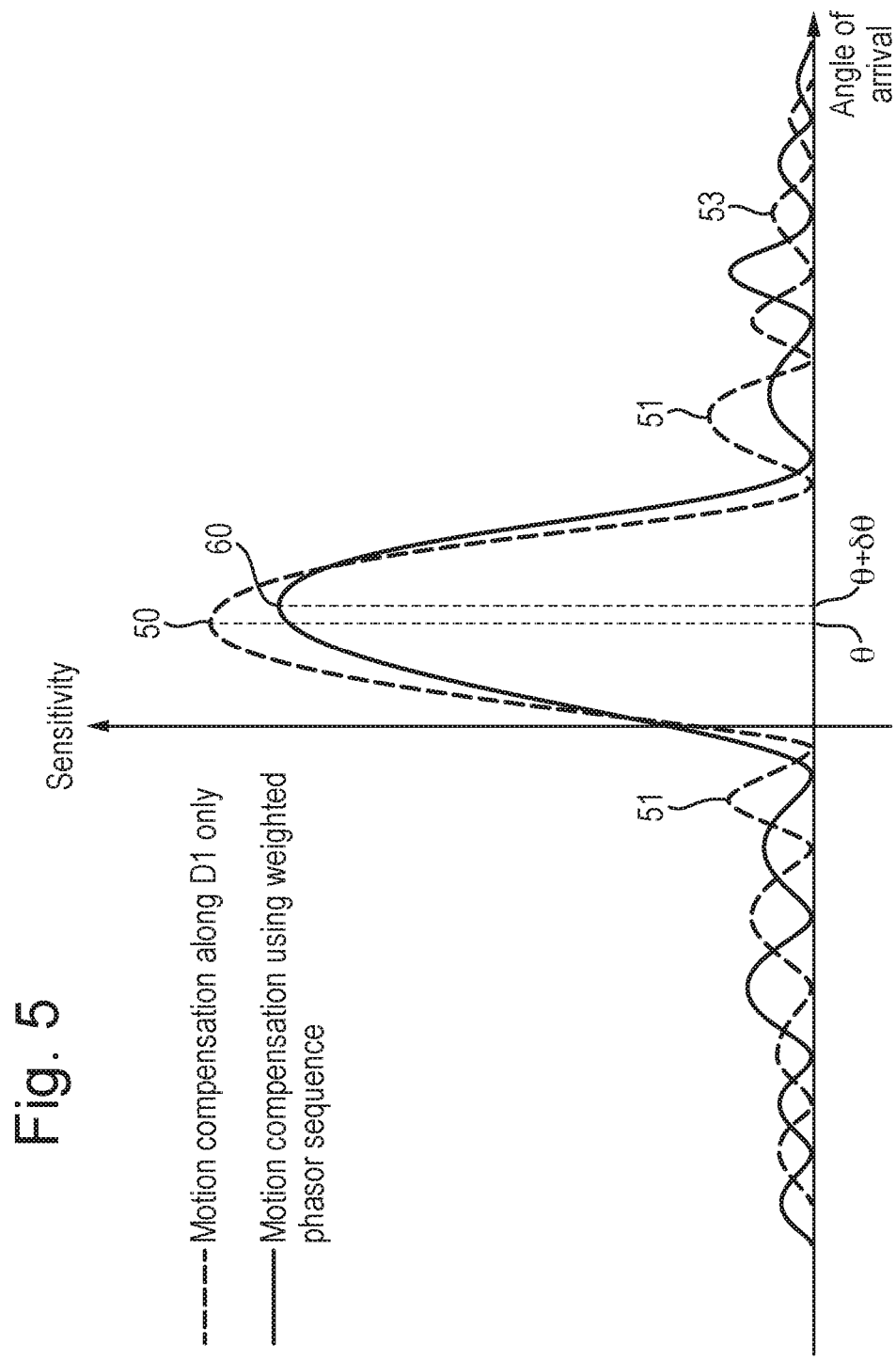
FIG. 5 schematically outlines the effect of the present invention on the sensitivity of signal reception from different directions.

The effect of performing correlation using the weighted phasor sequence vector W will now be described with reference to FIG. 5. FIG. 5 is a diagram schematically illustrating the sensitivity to incoming signals (vertical axis) against the angle of arrival (horizontal axis) when correlation is performed using a phasor sequence generated in respect of receiver motion along the desired SL signal direction $D_1$ only (dashed line in FIG. 5), and when correlation is performed using the weighted phasor sequence vector W in accordance with the present invention (solid line in FIG. 5). If the receiver moves in a straight line then the horizontal axis denotes the cone angle θ relative to the direction of motion. For a complicated receiver path the relationship between the arrival angle and sensitivity is a non-linear mapping and is represented by a 3D surface. For the purposes of this example, we consider a simple linear receiver path, and the SL signal direction $D_1$ has an angle of arrival A at the receiver.

Referring first to the dashed line (motion compensation along $D_1$ only), we can see a peak (shown at 50) at angle θ corresponding to the desired signal direction $D_1$ and a number of secondary peaks corresponding to undesired signal angles. In certain circumstances the combination of the sensitivities of the secondary peaks and the strength of signal(s) received along the corresponding angle(s) can result in a higher received signal strength for the undesired signal(s) compared to the desired signal, and the receiver may inadvertently lock on to an undesired signal, e.g., the reflected signal $X_2$ or the spoofer signal $X_3$. As has been explained above, this is a particular problem if the desired SL signal is particularly weak and/or the undesired signals have high signal strength.

The solid line schematically illustrates the sensitivity when the weighted phasor sequence vector W is used for correlation with the same signal data received at the antenna. The sensitivity pattern still exhibits a significant peak (shown at 60) and a number of secondary peaks. However, the sensitivity is significantly reduced at the angles where secondary peaks were present when using motion compensation along the direction $D_1$ only. In particular, the sensitivity of the solid line is significantly suppressed at the angles corresponding to the first secondary peaks (51) in the dashed line pattern. In some instances, the sensitivity pattern of the solid line exhibits a null corresponding to a peak in the dashed line gain pattern (e.g., as shown at 53). Consequently, the risk of the receiver "locking on" to an undesirable signal direction is significantly reduced when performing correlation using the weighted phasor sequence vector W.

It is noted that the peak of the weighted phasor sequence vector W gain pattern has a slightly smaller amplitude and has shifted in angle by a small amount 60 as compared to the dashed line phasor sequence. However, this does not adversely affect the ability of the receiver to lock on to the desired SL signal $X_1$, in particular due to the significant suppression of side lobe gain along the undesired signal directions. It will therefore be appreciated that the motion-compensated correlation process using the weighted phasor sequence vector W significantly improves correlation in conventionally difficult environments such as multi-path environments or situations where strong undesired signals such as from spoofers are present.

We now refer back to step S104 of the flow diagram outlined in FIG. 3, where the first direction(s) (in which signals are to be enhanced) and second direction(s) (in which signals are to be suppressed) are determined and consider one exemplary method of determining said directions. The principal steps of this method are set out in the flow diagram of FIG. 6 and are performed by the direction determination unit 6.

Figure 7:
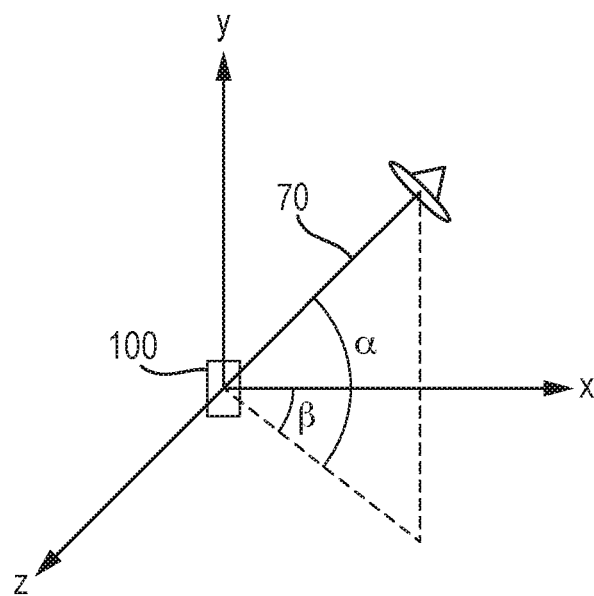
FIG. 7 schematically illustrates a candidate second direction.

The flow diagram of FIG. 6 represents a "brute force" search of the sky in order to generate candidate directions in which undesirable signals such as NSL signals are received. It is noted that the desired SL directions are generally known due to knowledge of the positions of the satellite in the positioning constellation (e.g., through broadcast almanac and ephemeris data stored on the receiver 100). At step S104a, the direction determination unit 6 generates motion compensation phasors representing the motion of the receiver in a plurality of candidate directions which are selected to provide full coverage of the sky for all possible directions in which signals may be received by selecting appropriate values for elevation α and azimuth β. A candidate direction 70 at particular angles of α and β is illustrated in FIG. 7. The motion compensation phasors are generated in accordance with the measured or assumed movement of the receiver along the candidate directions.

For each candidate direction, a motion-compensated correlation signal is calculated by correlating the local and received signals and applying the motion compensated phasor sequence for that candidate direction (step S104b). As before, the motion compensation phasor sequence may be applied to at least one of the local signal, received signal, and the result of the correlation.

At step S104c, the direction determination unit 6 performs an analysis of the motion compensated correlation signal to determine whether the candidate direction is a direction in which a signal is likely to have been received. This is typically based on an analysis of the signal-to-noise ratio for the motion compensated correlation signal for that candidate direction. For example, if a high signal to noise ratio is determined then that candidate direction is a likely direction along which a signal is received. Such a signal is likely to be an undesirable NSL signal (e.g., reflected signal) if the candidate direction was not a SL direction to a trusted source.

If the motion compensated correlation signal has a low signal to noise ratio (e.g., an SNR of around 1 or less), it may be inferred that no reflected signal is received along that candidate direction.

At step S104d, optionally, the motion compensated phasors for candidate directions in which it is determined that an undesired (e.g., reflected NSL) signal was likely to have been received may be stored in local storage 16. These stored phasor sequences and associated directions may be re-used in appropriate subsequent time periods where it is assumed that the motion of the receiver and the first and second directions remain substantially constant across the time periods, in order to generate the weighted phasor sequence vector W in step S107. This advantageously optimises the use of processing and power resources rather than having to re-generate the phasor sequences in S106.

As well as identifying likely reflected NSL signal directions, such a "brute force" search may be used to identify potential counterfeit sources such as spoofers. The technique described above can be used to distinguish trusted signals transmitted by trusted remote positioning sources from counterfeit signals based on signal arrival directions and knowledge of the directions towards the trusted remote sources.

Such a brute force search of the sky is a computationally intensive process, and in one embodiment the desired and undesired directions may be determined by making use of a topographical (e.g., three dimensional) model of the environment surrounding the receiver 100 (such as a 3D city model). Such a model may be stored in local storage 16 and provided to the direction determination unit 6 as required.

In embodiments where a 3D model is used, the map may be used to target the candidate directions where a reflected signal is likely to be received, rather than the "brute force" approach of scanning substantially all elevations and azimuths as described above. For example, motion compensation may be provided along the straight-line direction to a trusted source, and an analysis performed of the total signal strength from that trusted source and the signal to noise ratio of the motion-compensated correlation signal. Based on said analysis, it may be inferred whether or not a reflected signal was received. For example, if the signal to noise ratio of the motion-compensated correlation signal is relatively low but the receiver 100 receives a high signal strength from that satellite, it may be inferred that a reflected signal is dominating the received signal from that satellite. The 3D model of the environment may be then used to determine candidate directions in which reflected signals may be received (e.g., reflected from the buildings) at the receiver.

Such a 3D model may be used in determining counterfeit sources such as spoofers if a signal component is received along a direction in a brute force scan of the sky that would not be possible for any reflection to have occurred, based on the 3D model.

More detail on the use of a 3D model to generate candidate directions can be found in commonly assigned patent publication WO2019/058119, which is hereby incorporated by reference in its entirety.

In some embodiments a 3D model of the receivers environment may be used to predict in advance where reflections are likely to be received from, and the determination of the first and second directions in step S104 may be performed based on said predictions without using the method of FIG. 6.

In the examples outlined so far, the first direction(s) in which signals are to be enhanced are SL signals to a trusted source. It is contemplated that this will be the case in the majority of instances. However, the present invention may be used to provide preferential gain in any desired direction, for example there may be use cases where the desired first direction is the SL direction to a spoofer if the aim is to locate the spoofer source. In such cases, the weighted phasor sequence W would be used to actively suppress the SL or NSL satellite signals.

The present invention has particular application to receivers 100 that make use of a single antenna, with the method performed by the receiver software being used to spatially discriminate the received signals. However, it is contemplated that in other embodiments the receiver may comprise two or more antennas that may be used to further aid in distinguishing the directions along which signals are received in combination with the method as described above.

Here multiple examples have been given to illustrate various features and are not intended to be so limiting. Any one or more of the features may not be limited to the particular examples presented herein, regardless of any order, combination, or connections described. In fact, it should be understood that any combination of the features and/or elements described by way of example above are contemplated, including any variation or modification which is not enumerated, but capable of achieving the same. Unless otherwise stated, any one or more of the features may be combined in any order.

As above, figures are presented herein for illustrative purposes and are not meant to impose any structural limitations, unless otherwise specified. Various modifications to any of the structures shown in the figures are contemplated to be within the scope of the invention presented herein. The invention is not intended to be limited to any scope of claim language.

Where "coupling" or "connection" is used, unless otherwise specified, no limitation is implied that the coupling or connection be restricted to a physical coupling or connection and, instead, should be read to include communicative couplings, including wireless transmissions and protocols.

Any block, step, module, or otherwise described herein may represent one or more instructions which can be stored on a non-transitory computer readable media as software and/or performed by hardware. Any such block, module, step, or otherwise can be performed by various software and/or hardware combinations in a manner which may be automated, including the use of specialized hardware designed to achieve such a purpose. As above, any number of blocks, steps, or modules may be performed in any order or not at all, including substantially simultaneously, i.e., within tolerances of the systems executing the block, step, or module.

Where conditional language is used, including, but not limited to, "can," "could," "may" or "might," it should be understood that the associated features or elements are not required. As such, where conditional language is used, the elements and/or features should be understood as being optionally present in at least some examples, and not necessarily conditioned upon anything, unless otherwise specified.

Where lists are enumerated in the alternative or conjunctive (e.g., one or more of A, B, and/or C), unless stated otherwise, it is understood to include one or more of each element, including any one or more combinations of any number of the enumerated elements (e.g., A, AB, AC, ABC, ABB, etc.). When "and/or" is used, it should be understood that the elements may be joined in the alternative or conjunctive.

While the foregoing is directed to embodiments of the present invention, other and further embodiments of the invention may be devised without departing from the basic scope thereof, and the scope thereof is determined by the claims that follow.

The invention claimed is:

1. A method performed in a positioning system, comprising:
   receiving, at a receiver, a signal from one or more remote sources;
   determining motion of the receiver;
   determining a first direction, wherein signals received at the receiver along the first direction are desired to be enhanced;
   determining a second direction, wherein signals received at the receiver along the second direction are desired to be suppressed;
   obtaining first and second phasor sequences indicative of the motion of the receiver in the first and second directions respectively;
   generating a third phasor sequence based on a weighted combination of the first and second phasor sequences;
   providing a local signal; and
   providing a correlation signal using the third phasor sequence, wherein providing the correlation signal comprises correlating the local signal with the received signal, and combining the result of the correlation with the third phasor sequence, such that a signal received along the second direction is suppressed relative to a signal received along the first direction.

2. The method of claim 1, wherein the first direction is a straight-line direction from a remote source to the receiver.

3. The method of claim 1, wherein the second direction is a non-straight-line direction from a remote source to the receiver, or a straight-line direction from an untrusted remote source to the receiver.

4. The method of claim 1, wherein the first and second phasor sequences are derived from the determined motion of the receiver as a function of time.

5. The method of claim 1, wherein the third phasor sequence is generated using an estimation process.

6. The method of claim 1, wherein the third phasor sequence, W, is generated by:

$$W = S^+ Z$$

where S is a matrix representing the first and second phasor sequences, $S^+$ is a pseudoinverse of matrix S, and Z is a matrix representing the weighting of the first and directions.

7. The method of claim 1, wherein the first direction is determined based on a known or estimated position of a remote source.

8. The method of claim 1, wherein the determining of the second direction is based on an analysis of the received signal.

9. The method of claim 8, wherein said analysis comprises:
   generating a respective phasor sequence for one or more directions based on the motion of the receiver in the respective one or more directions;
   for each direction, providing a direction correlation signal using the respective phasor sequence, wherein providing the direction correlation signal comprises correlating the local signal with the received signal data, and combining at least one of the local signal, received signal, and the result of the correlation with the respective phasor sequence, and
   determining the second direction based on an analysis of the respective one or more direction correlation signals.

10. The method of claim 9, wherein a phasor sequence is generated for a straight-line direction between the receiver and a remote source, and wherein;
   the analysis further comprises determining whether a received signal includes a component received in a direction that is different from the straight-line direction, wherein the determination is based on the signal strength of the received signal from the remote source and the signal to noise ratio of the direction correlation signal.

11. The method of claim 9, wherein respective phasor sequences are generated for a plurality of directions distributed across all possible directions in which a signal can be received at the receiver, and wherein the analysis further comprises determining whether a signal is received along each of the plurality of the directions based at least on the signal to noise ratio of the respective direction correlation signal.

12. The method of claim 1, wherein the determining of the second direction is based on a topographical model of the environment in which the receiver is located, wherein said model is used to predict the presence of reflected signals that are received at the receiver.

13. The method of claim 1, wherein the determining of the first direction and the determining of the second direction are based on prior knowledge of the environment in which the receiver is located.

14. The method of claim 1, further comprising determining a position of the receiver based on the correlation signal.

15. Apparatus for receiving radio signals comprising:
a receiver configured to receive a signal from one or more remote sources;
a motion module configured to determine motion of the receiver;
a direction determination unit configured to determine a first direction and a second direction, wherein signals received at the receiver along the first direction are desired to be enhanced and signals received at the receiver along the second direction are desired to be suppressed;
a local signal generator configured to provide a local signal;
a phasor generation unit configured to:
obtain first and second phasor sequences indicative of the motion of the receiver in the first and second directions respectively, and generate a third phasor sequence based on a weighted combination of the first and second phasor sequences; and
a correlation unit configured to provide a correlation signal using the third phasor sequence, wherein providing the correlation signal comprises correlating the local signal with the received signal, and combining and the result of the correlation with the third phasor sequence, such that a signal received along the second direction is suppressed relative to a signal received along the first direction.

16. The apparatus of claim 15, further comprising a positioning unit configured to determine a position of the receiver based on the correlation signal.

17. The apparatus of claim 16, further comprising:
a local oscillator configured to provide a local frequency or phase reference; and
a local oscillator offset determination unit configured to determine an offset between the local frequency or phase reference and a received frequency or received phase of a first reference signal received from at least one of the remote sources, said first reference signal having a known or predictable frequency or phase, and wherein
at least one of the first and second phasor sequences obtained by the phasor generation unit is indicative of the determined offset.

18. The apparatus of claim 16, further comprising:
a local oscillator configured to provide a local frequency or phase reference; and
a local oscillator offset determination unit configured to determine an offset between the local frequency or phase reference and a received frequency or received phase of a first reference signal received from at least one of the remote sources, said first reference signal having a known or predictable frequency or phase, and wherein
the local signal generator is configured to use the local frequency or phase reference from the local oscillator, and the determined offset, to provide the local signal.

19. The apparatus of claim 16, wherein the third phasor sequence is generated using an estimation process.

20. The apparatus of claim 19, wherein the estimation process is based on the desired enhancement of signals received along the first direction and the desired suppression of signals received along the second direction.

21. The apparatus of claim 16, wherein the third phasor sequence, W, is generated by:

$$W = S^+ Z$$

where S is a matrix representing the first and second phasor sequences, $S^+$ is pseudoinverse of matrix S, and Z is a matrix representing the weightings of the first and second directions.

22. The apparatus of claim 16, wherein the receiver is a GNSS receiver and the at least one remote source includes at least one GNSS satellite.

23. An apparatus for receiving radio signals comprising:
a processor; and
a memory accessible to the processor, the memory having stored therein at least one of programs or instructions executable by the processor to configure the apparatus to:
receive, at a receiver, a signal from one or more remote sources;
determine motion of the receiver;
determine a first direction, wherein signals received at the receiver along the first direction are desired to be enhanced;
determine a second direction, wherein signals received at the receiver along the second direction are desired to be suppressed;
obtain first and second phasor sequences indicative of the motion of the receiver in the first and second directions respectively;
generate a third phasor sequence based on a weighted combination of the first and second phasor sequences;
provide a local signal; and
provide a correlation signal using the third phasor sequence, wherein providing the correlation signal comprises correlating the local signal with the received signal, and combining the result of the correlation with the third phasor sequence, such that a signal received along the second direction is suppressed relative to a signal received along the first direction.

24. A method performed in a positioning system, comprising:
receiving, at a receiver, a signal from one or more remote sources;
determining motion of the receiver;
determining a first direction, wherein signals received at the receiver along the first direction are desired to be enhanced;

determining a second direction, wherein signals received at the receiver along the second direction are desired to be suppressed;

obtaining first and second phasor sequences indicative of the motion of the receiver in the first and second directions respectively;

generating a third phasor sequence based on a weighted combination of the first and second phasor sequences;

providing a local signal;

combining one of the local signal or the received signal with the third phasor sequence; and providing a correlation signal using the third phasor sequence, wherein providing the correlation signal comprises, after the combination, correlating the local signal with the received signal, such that a signal received along the second direction is suppressed relative to a signal received along the first direction.

25. An apparatus for receiving radio signals comprising:

a receiver configured to receive a signal from one or more remote sources;

a motion module configured to determine motion of the receiver;

a direction determination unit configured to determine a first direction and a second direction, wherein signals received at the receiver along the first direction are desired to be enhanced and signals received at the receiver along the second direction are desired to be suppressed;

a local signal generator configured to provide a local signal;

a phasor generation unit configured to:
  obtain first and second phasor sequences indicative of the motion of the receiver in the first and second directions respectively,
  generate a third phasor sequence based on a weighted combination of the first and second phasor sequences; and
  combine one of the local signal or the received signal with the third phasor sequence;

and a correlation unit configured to provide a correlation signal using the third phasor sequence, wherein providing the correlation signal comprises, after the combination, correlating the local signal with the received signal, such that a signal received along the second direction is suppressed relative to a signal received along the first direction.

26. An apparatus for receiving radio signals comprising:

a processor; and a memory accessible to the processor, the memory having stored therein at least one of programs or instructions executable by the processor to configure the apparatus to:

receive, at a receiver, a signal from one or more remote sources;

determine motion of the receiver;

determine a first direction, wherein signals received at the receiver along the first direction are desired to be enhanced;

determine a second direction, wherein signals received at the receiver along the second direction are desired to be suppressed;

obtain first and second phasor sequences indicative of the motion of the receiver in the first and second directions respectively;

generate a third phasor sequence based on a weighted combination of the first and second phasor sequences;

provide a local signal;

combine one of the local signal or the received signal with the third phasor sequence; and provide a correlation signal using the third phasor sequence, wherein providing the correlation signal comprises, after the combination, correlating the local signal with the received signal, such that a signal received along the second direction is suppressed relative to a signal received along the first direction.

* * * * *

UNITED STATES PATENT AND TRADEMARK OFFICE
CERTIFICATE OF CORRECTION

| | | |
|---|---|---|
| PATENT NO. | : 12,436,297 B2 | Page 1 of 1 |
| APPLICATION NO. | : 17/947911 | |
| DATED | : October 7, 2025 | |
| INVENTOR(S) | : Ramsey Michael Faragher et al. | |

It is certified that error appears in the above-identified patent and that said Letters Patent is hereby corrected as shown below:

On the Title Page

Item (74) in attorney, agent or firm, delete "MOSER TABOA" and insert -- Moser Taboada --

Signed and Sealed this
Thirteenth Day of January, 2026

John A. Squires
*Director of the United States Patent and Trademark Office*